Dec. 16, 1969   N. STEIN ET AL   3,484,458
TRIMELLITIC ACID PRODUCTION AND RECOVERY OF
INTRAMOLECULAR ANHYDRIDE
Filed Sept. 19, 1966   3 Sheets-Sheet 2

Fig. 2

INVENTORS.
Norman Stein
Delbert H. Meyer
James O. Knobloch
Hsiang Peng Liao

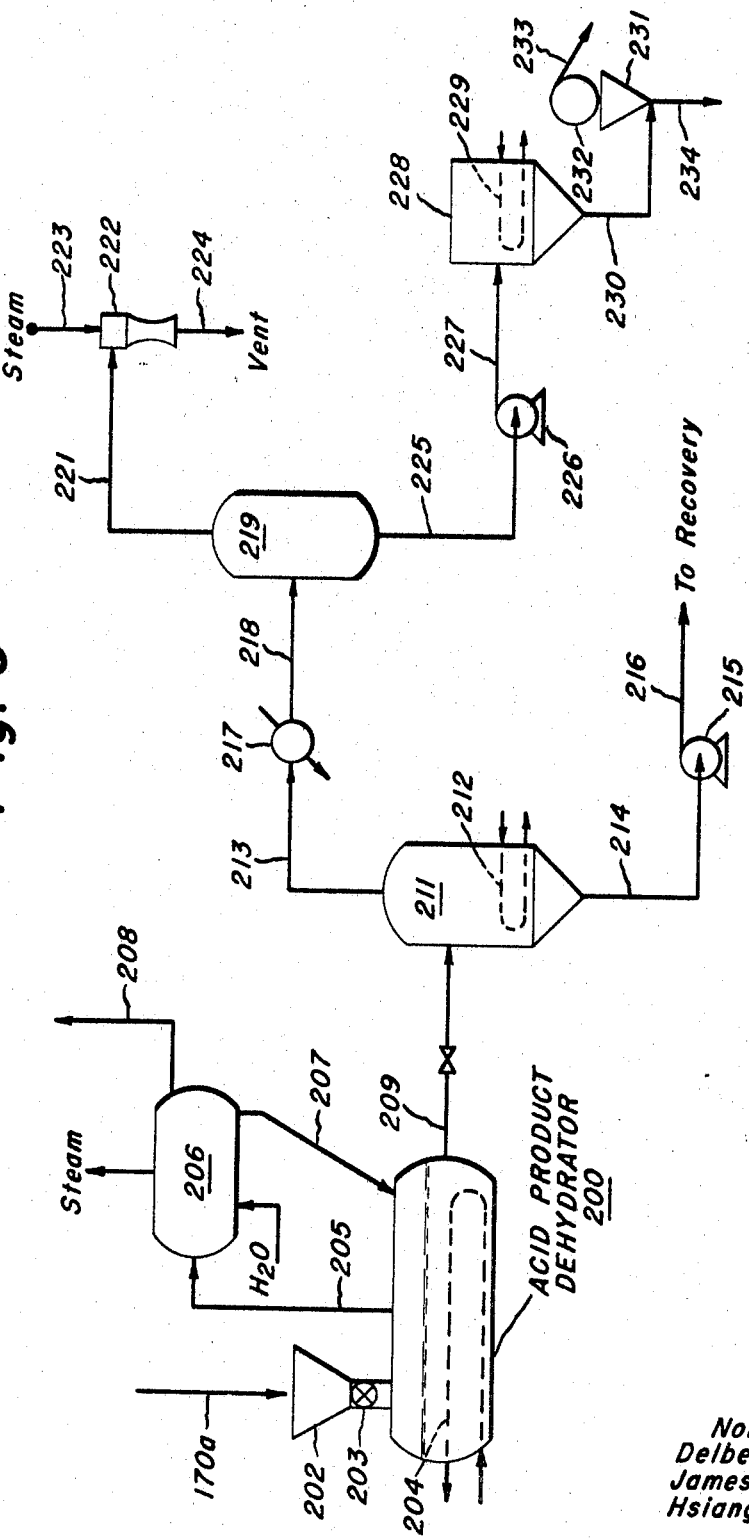

United States Patent Office 3,484,458
Patented Dec. 16, 1969

3,484,458
TRIMELLITIC ACID PRODUCTION AND RECOVERY OF INTRAMOLECULAR ANHYDRIDE
Norman Stein, Flossmoor, Ill., Delbert H. Meyer, Highland, and James O. Knobloch, Hobart, Ind., and Hsiang Peng Liao, Glen Burnie, Md., assignors to Standard Oil Company, Chicago, Ill., a corporation of Indiana
Filed Sept. 19, 1966, Ser. No. 580,389
Int. Cl. C07c 63/32
U.S. Cl. 260—346.4                                5 Claims

ABSTRACT OF THE DISCLOSURE

Production and recovery of trimellitic acid intramolecular anhydride (TMA) is enhanced by conducting catalytic liquid phase oxidation of pseudocumene with air in the presence of 2 to 6 weight parts acetic acid having 2 to 5 weight percent water at a temperature of 325° to 450° F. in an oxidation zone, cooling a mixture of oxidation zone reaction effluent and latter obtained bottoms fraction of high melting solids in two series staged stirred crystallization zones by evaporation of acetic acid wherein the first crystallization zone is operated at 285 to 320° F. and an absolute pressure of 39 to 63 pounds per square inch and the second zone is operated at 120° to 140° F. and an absolute pressure of 75 to 115 mm. Hg, separating and recovering trimellitic acid crystalline precipitate from the slurry thereof in acetic acid mother liquor formed in the second zone, washing the recovered crystalline precipitate with acetic acid having 2 to 5% water, distilling a mixture of said acetic acid mother liquor and wash liquor to remove from 65 to 95% of the total of acetic acid and water in that mixture of liquors leaving high melting point solids containing bottoms fraction for recycle to the two stage crystallization, adding the washed crystalline trimellitic acid to molten crude TMA at a temperature of 400° to 500° F. and a pressure of 20 mm. Hg to one atmosphere, removing from such pool crude TMA equivalent to trimellitic acid charged thereto and distilling the removed crude TMA at 575° to 425° F. and absolute pressure of 10 to 55 mm. Hg.

---

Figure 1:
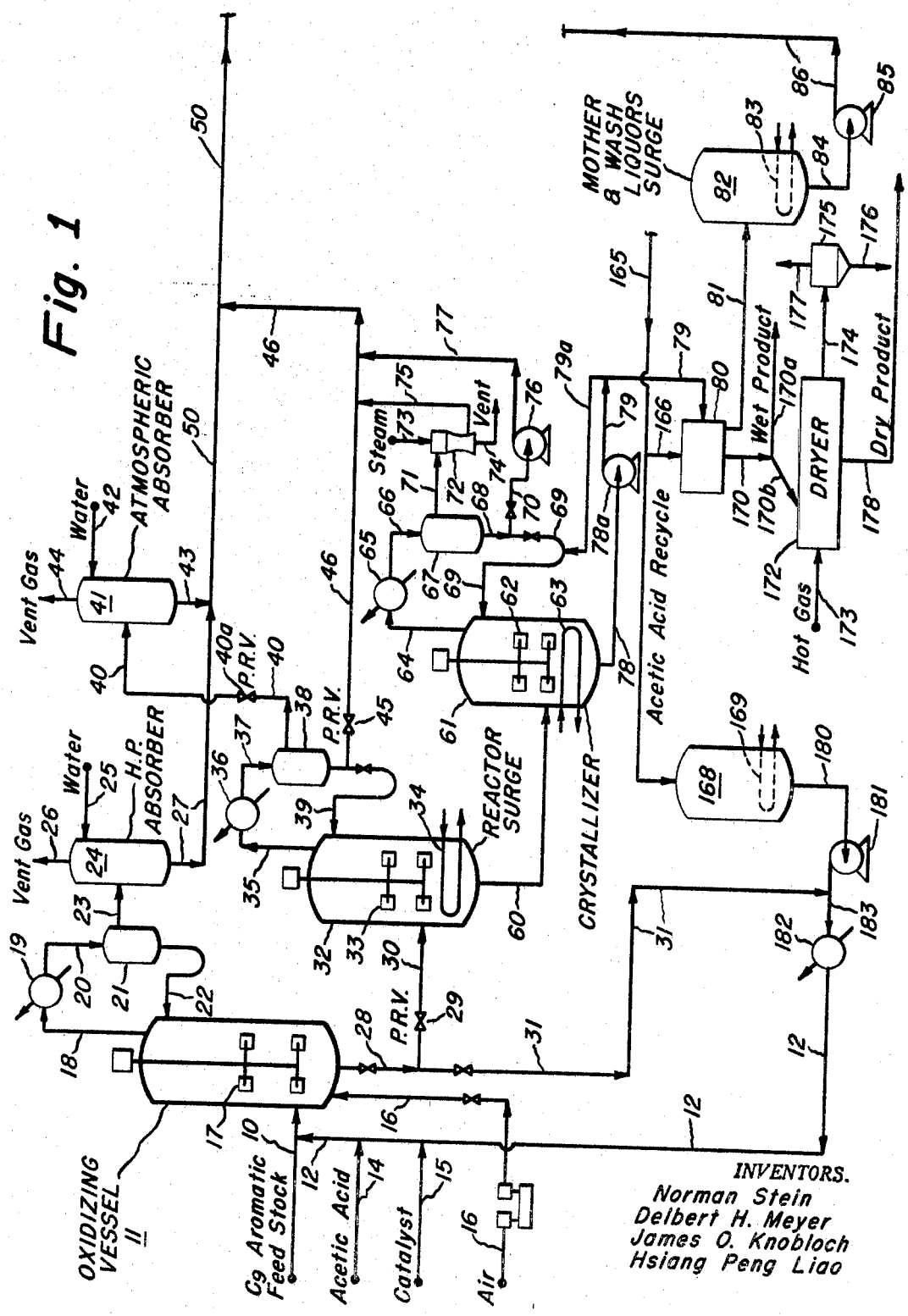

This invention pertains to the production of trimellitic acid (1,2,4-benzene tricarboxylic acid) and its recovery as the intramolecular anhydride 4-carboxyphthalic anhydride. More specifically, this invention pertains to a commercial process for the manufacture of 4-carboxyphthalic anhydride through the catalytic liquid phase oxidation of commercially available 1,2,4-trimethylbenzene (pseudocumene) with air in the presence of acetic acid as reaction solvent, separation and recovery of crystalline trimellitic acid from the oxidation reaction effluent, thermal dehydration of trimellitic acid to its anhydride and separation and recovery of that anhydride from intermediate oxidation by-product and other oxidation by-product impurities by distillation and/or vaporization process steps.

Pseudocumene is oxidized with air mainly to a mixture of dimethylbenzoic acids in the presence of catalysis provided only by cobalt and/or manganese oxidation catalysts under liquid phase conditions using acetic acid as the reaction solvent. By the use of oxygen as oxidant and a combination of cobalt as metal oxidation catalyst and alpha-methylenic ketones as side chain oxidation initiator or promoter, pseudocumene is oxidized mainly to a mixture of 2-methylterephthalic acid and 4-methyl isophthalic acid in the presence of acetic acid solvent and under liquid phase conditions at atmospheric pressure. Catalytic liquid phase oxidation of pseudocumene with air can be accomplished in the presence of acetic acid solvent and the catalysis provided by the combination of heavy metal oxidation catalyst and a source of bromine as disclosed and claimed in U.S. Patent 2,833,816. This oxidation method using a combination of heavy metal oxidation catalyst and a source of bromine to provide catalysis describes the production of 92 weight percent trimellitic acid filter cake product in a two hour reaction at 198° C. The theoretical yield of trimellitic acid from pseudocumene is 175 weight percent. However, the oxidation method of U.S. Patent 2,833,816 has been developed to produce total trimellitic acid yields in the range of 135 to 161 weight percent or about 77% to about 92% of theory based on the pseudocumene hydrocarbon feed. By total yield of trimellitic acid is meant all of the trimellitic acid in the oxidation reaction effluent.

Commercially available pseudocumene is not pure and contains 2 to 5 weight percent of alkyl substituted benzenes having boiling points close to that of pseudocumene such as ethyl toluenes and mesitylene $C_9$ aromatics and even some $C_8$ aromatics such as the xylenes. The ethyl toluenes and xylenes impurities are oxidized to phthalic acids and mesitylene is oxidized to trimesic acid (1,3,5-benzene tricarboxylic acid) at the same time pseudocumene is oxidized to trimellitic acid. It is difficult to convert all of the three methyl groups of pseudocumene to carboxylic acid groups. This difficulty arises from the effect that conversion of one of the two ortho-oriented methyl groups to a carboxylic acid group has on the remaining methyl group. That oxidation difficulty results in the co-production of small amounts of 4-methylorthophthalic acid, 2-methylterephthalic acid and 4-methylisophthalic acid. That oxidation difficulty is in addition to the co-production of such next to last step oxidation by-products as the formylphthalic acids. The last oxidation step product of pseudocumene is, of course, trimellitic acid.

The more highly developed catalytic liquid phase air oxidation of pseudocumene by the method of U.S. Patent 2,833,816 using the catalysis provided by the combination of heavy metal oxidation catalysts therein defined with bromine or a source of bromine under liquid phase oxidation conditions produces total trimellitic acid yields of 135 to 161 weight percent based on commercially available pseudocumene. But, even then, there are also co-produced trimesic acid, iso- and terephthalic acids, 4-methylorthophthalic acid, 2-methylterephthalic acid, 4-methylisophthalic acid and formyl phthalic acids in amounts as to present substantial problems in the recovery of high quality trimellitic acid, dehydration of trimellitic acid to its intramolecular anhydride and recovery of that anhydride.

Another problem in the manufacture of the intramolecular anhydride of trimellitic acid through the oxidation of pseudocumene to trimellitic acid in the presence of acetic acid comes from the relatively high solubility of trimellitic acid in acetic acid. This solubility goes from about 1.0 pound per 100 pounds glacial acetic acid at 25° C. to 7.76 pounds per 100 pounds glacial acetic acid at 110° C. The presence of water in the acetic acid increases the solubility of trimellitic acid so that in aqueous acetic acid solvent having 82 to 85% acetic acid and 18 to 15% water by weight there are dissolved at 25° and 110° C. about 3.2 pounds and 16.5 pounds trimellitic acid per 100 pounds solvent. Ordinarily aqueous acetic acid of 95 to 98% (5 to 2% water) by weight is used in the oxidation as solvent not only because acetic acid of higher strength is more expensive to recover but also because the presence of 2 to 5% water by weight substantially eliminates oxidation induction. During oxidation of the methyl groups to carboxylic acid groups water is produced as a by-product and is generally retained through the removal of heat of reaction by condensing the acetic acid boil up from the liquid phase in the oxidation zone and returning the condensate to the oxidation zone. The aqueous acetic acid solvent in the effluent removed from the oxidation zone can contain about 8 to 20% water (92 to 80% acetic acid) by weight when the 95 to 98% aqueous acetic acid solvent is used in the weight ratios of 5 to 2 parts per part of pseudocumene. Thus at usual crystallization temperatures of 60 to 100° F. a substantial amount of trimellitic acid remains in solution.

For example, in Example II of U.S. Patent 3,161,658 there is described the cooling to 100° F. of an oxidation reaction effluent containing for each 500 parts acetic acid solvent 200 parts trimellitic acid and 50 parts of pseudocumene oxidation intermediates. There was recovered 135 parts crystalline trimellitic acid per 500 parts of acetic acid solvent. Thus, of the originally produced 200 parts trimellitic acid there was left in solution 65 parts or 32.5%. This appears to have been an oxidation of pseudocumene conducted in the presence of acetic acid solvent in the ratio of about 3.5 parts solvent per part of pseudocumene. Higher ratios of solvent to pseudocumene would have caused a greater proportion of the total trimellitic acid to remain in solution at 100° F. For example, at a 5 to 1 solvent ratio 45% of the trimellitic acid produced would have remained in solution at crystallization and filtration temperatures of 100° F.

U.S. Patent 3,161,658 provides one technique for recovering the trimellitic acid remaining dissolved in the aqueous acetic acid mother liquor. This is done by adding the mother liquor to a pool of molten trimellitic anhydride (370–375° F.) and flashing off water and acetic acid vapors and drawing off from the molten pool liquid in an amount equivalent to the weight of solids charged with the mother liquor. This liquid draw off is solidified, ground and dissolved in a dialkyl ketone or aromatic hydrocarbon (the ketone solution must be filtered to remove insolubles) and the solution is combined with anhydride from dehydrated 100° F. filter cake. The aromatic hydrocarbon solution is filtered to remove an insoluble oily residue and the filtrate cooled to 75° F. to precipitate trimellitic anhydride. This anhydride can be added to the anhydride from dehydration of 100° F. first filter cake. By simple flashing at 6 mm. Hg absolute there is recovered a trimellitic anhydride product of 95% anhydride content, 95% pure in yields of 85 to 90% based on the trimellitic acid produced by the oxidation. However, the ketone and aromatic hydrocarbon solvents are flammable and their foregoing uses although advantageous do present fire hazards.

Other problems in the recovery of trimellitic anhydride from trimellitic acid produced by catalytic liquid phase air oxidation in acetic acid solvent arises in the distillative and/or evaporative separation of trimellitic anhydride from the melt produced by dehydrating trimellitic acid. In this melt there is a substantial amount of iso- and terephthalic acids produced mainly as co-products of oxidation and some by decarboxylation of trimellitic acid when the dehydration is carried out at temperatures of 410 to 428° F. or higher. The literature reports that trimellitic acid is dehydrated to its intramolecular anhydride at 216° C. (about 421° F.). But at 410° to 428° F. some decarboxylation takes place not to produce phthalic anhydride only but rather to produce mainly iso- and terephthalic acids. However, this decarboxylation can be substantially eliminated during dehydration by operating at about 335° to 400° F. with an inert gas sweep. This is disclosed and claimed in U.S. Patent 2,971,011. The gas sweep is conducted with a gas inert to trimellitic anhydride at 335 to 400° F. Nitrogen, flue gas, $CO_2$, hydrocarbon vapors and even steam can be used as inert gas.

Such gas sweep dehydration does not eliminate the problem caused by the presence of oxidation by-products iso- and terephthalic acids. When either or both of isophthalic acid and terephthalic acid are present in the molten trimellitic anhydride to be recovered by distillative and/or evaporative techniques they are carried over with the trimellitic anhydride vapors after the amounts thereof in the molten anhydride bottoms reaches their saturation concentrations. This, of course, adversely affects the clarity and purity of recovered molten trimellitic intramolecular anhydride and the reactivity of the anhydride.

The intramolecular anhydride of trimellitic acid has become a commercial starting material for surface coatings having the desired properties of high thermal decomposition, high temperature insulating properties and good resistance to chemical attack and are substantially insoluble. These surface coatings are obtained from prepolymers prepared, for example, from trimellitic intremolecular anhydrides and polyamines. Because of the trifunctionality of the intramolecular anhydride the final surface coating product is a polyimide-amide. The intramolecular anhydride of trimellitic acid also has become a starting material for solid foams obtained by reacting an isothiocyanate among other reactants with the intramolecular anhydride. Air and heat drying points and enamels with hydrocarbon or water solvent vehicles are also prepared from the intramolecular anhydride of trimellitic acid. For most of these uses, trimellitic acid intramolecular anhydride of an anhydride purity of 98 to 99% is required.

The problems that require solving are the recovery of trimellitic acid anhydride in yields above 85 to 90% based on trimellitic acid produced by catalytic liquid phase oxidation of pseudocumene with air in the presence of acetic acid solvent, the increase of recovery of trimellitic acid from the oxidation reaction effluent, an improved distillative and/or evaporative process for separating the intramolecular anhydride from the crude anhydride melt obtained by the dehydration of impure trimellitic acid, elimination of the fire hazards, accompanying the use of dialkyl ketones or aromatic hydrocarbon extract solvents previously disclosed for advantageous use in increasing the recovery of trimellitic acid anhydride and the other problems before mentioned.

We have discovered an improved process for the manufacture of trimellitic acid intramolecular anhydride starting with pseudocumene. The improvement arises from the discovery of a process for recovering trimellitic acid intramolecular anhydride of 98–99% anhydride content in yields in the range 90 to 97% and higher based on the total trimellitic acid produced by catalytic liquid phase air oxidation of pseudocumene in the presence of catalysis provided by the combination of heavy metal oxidation catalyst and bromine or a source of bromine and in the presence of acetic acid solvent having 95 to 98% acetic acid and 5 to 2% water by weight. The recovery portion of the process of this invention starts with the effluent from the oxidation process which produces 135 to 161 weight percent or more trimellitic acid based on pseudocumene oxidized with air in the presence of 2 to 5 parts of said 95 to 98% aqueous acetic acid solvent as oxidation reaction effluent. Such oxidation reaction effluents contain 177 to 336 parts aqueous acetic acid of about 9 to about 28% water (91 to 72% acetic acid) per 100 parts trimellitic acid, all by weight. Since the anhydride recovery technique of this invention is equally applicable, as will be later apparent, to oxidation reaction effluents having aqueous acetic acid solvent of such wide water variation as 9 to 28 weight percent, there is eliminated the need for having precise control over the water content of the solvent initially charged to the oxidation reaction as before thought or appeared to be needed to aid in the separation and recovery of trimellitic acid.

The recovery portion of the total process of this invention is continuous and comprises the following steps. The effluent withdrawn from the oxidation reaction is introduced into a first crystallization zone operated at a temperature and pressure below the temperature and pressure in the oxidation zone from which the effluent is withdrawn but at a positive or above atmospheric pressure and is so operated to crystallize 5 to 30% of the total trimellitic acid in the effluent. It is preferred to introduce the effluent below the liquid level in the first crystallization zone so that solids do not form at and plug the inlet as would likely occur when the effluent inlet discharges into the vapor space above the crystallization zone. The water and acetic acid vapors evolved at such lower temperature and pressure are either condensed and the condensate returned to the crystallization zone or all of a portion of the wet acetic acid vapors are combined with other streams of wet acetic acid vapors after obtained as part of the feed to a fractionating zone for re-concentrating acetic acid to 95 to 98% for recycle to the oxidation. The first crystallization zone is stirred or agitated to keep the crystalline material in suspension.

The suspension of crystals formed in the first crystallization zone is introduced into a second crystallization zone operated at a sub-atmospheric pressure and at a temperature to crystallize 85 to 90% of the total trimellitic acid present. The suspension effluent from the first crystallization is preferably introduced below the liquid surface in the second crystallation zone for the above reason. The second crystallization zone also is stirred or agitated to maintain a suspension of crystals. Desirably the water and acetic acid vapors evolved from the second crystallization zone are condensed and the condensate returned to the second crystallization zone when necessary to have a flowable suspension, i.e. about 30–35 weight percent suspended crystals is a maximum for a readily flowable suspension. It is preferred to remove at least a portion of the acetic acid and water vapors as feed for acetic acid concentration.

The suspensions of crystals formed in the second crystallization zone is pumped out as feed for a means for separating solids and liquids. Such solid-liquid separation means as continuous centrifuging, filtering, settling and the like can be used. The separated crystalline product is washed with acetic acid, preferably a portion of the re-concentrated acetic acid. A wash of about 0.5 to 0.8 pound of acetic acid per pound of crystals is sufficient to displace mother liquor from the wet trimellitic acid crystals.

The mother liquor and wash liquor from the separation, recovery and washing of crystalline trimellitic acid are combined as feed for a stripping zone operated at 0 to 10 p.s.i.g. and a feed temperature of 448° to 500° F. In this manner water and acetic acid are substantially completely removed as the main feed to the acetic acid concentration and the trimellitic acid in the stripping zone feed is converted to the intramolecular anhydride of trimellitic acid. A convenient way to strip out acetic acid and water and at the same time dehydrate trimellitic acid is to use the combined acetic acid mother and wash liquors as feed to the top of a boiler operated at 448° to 500° F. and charge the vapors therefrom to a distillation column whose bottom temperature is at or just above the melting point of trimellitic anhydride and whose top temperature is 240 to 245° F. and pressure is 0 to 7.5 p.s.i.g. The bottoms from such a stripping operation are liquid.

The bottoms liquid from the stripping step is flashed at 5 to 20 mm. Hg absolute and 420 to 600° F. to remove 80 to 85% of the trimellitic anhydride content. Some of the aromatic co-product and by-product impurities boiling below trimellitic anhydride also are removed. The vapors from this low pressure flashing are condensed. The condensate contains 85 to 95% trimellitic anhydride. This condensate is pumped through a heat traced transfer conduit to one of the crystallization zones, preferably the first crystallization zone where there is sufficient acetic acid solvent at a temperature to dissolve at least the impurities in this recovered liquid. Such flashing can be accomplished in a flash drum having a knock-back condenser and/or a wiped film evaporator.

In this manner 90 to 95% of the total trimellitic acid produced by the oxidation is recovered as 97 to 99% anhydride purity intramolecular anhydride of trimellitic acid. The remaining 3 to 1% is the intramolecular trianhydride.

The previously mentioned starting oxidation reaction effluent is obtained by the air oxidation of pseudocumene in the presence of aqueous acetic acid solvent of 2 to 5 weight percent water content and in the presence of catalysis provided by the combined use of heavy metal oxidation catalyst and bromine at an oxidation temperature within the range of 350° and 450° F. and a pressure to maintain at least a liquid phase of acetic acid solvent and pseudocumene in the oxidation zone at the operating temperature. Pressures in the range of 150 to 450 p.s.i.g. (pounds per square inch gage) are satisfactory for maintaining necessary liquid phase conditions in the oxidation zone at said operating temperature. The oxidation can be conducted in a batchwise, semi-continuous or continuous manner. By "semi-continuous" is meant charging solvent and catalyst to an oxidation reactor and heating them to reaction temperature and pressure and then simultaneously introducing pseudocumene and air into the oxidation zone with or without additional components of the catalyst system until all the hydrocarbon has been added (i.e. the continuous portion) and then introducing air with or without catalyst components but not hydrocarbon into the oxidation zone (batchwise portion) until the oxidation of pseudocumene is substantially complete, i.e. oxygen is no longer being consumed. Semi-continuous, then in part combines some features of both continuous and batchwise oxidation. Continuous operation can be conducted in one oxidation zone or in a plurality of series connected oxidation zones, preferably three, or in a plug flow manner in a pipeline oxidation reactor having one or more than one inlet for catalyst component and/or air injection.

The precise conditions of operation developed for the oxidation of pseudocumene to go from 92 weight percent to 135 to 161 weight percent and higher total trimellitic acid are not material to the understanding and practice of the present invention. Also those precise operating conditions are not a part of this invention. This invention however does depend and uses to advantage the factual existence of the ability to obtain such high conversions of pseudocumene with air as the oxidant, the use of the system of catalyst provided by the combination of heavy metal oxidation catalyst and bromine as taught in U.S. Patent 2,833,816, the use of acetic acid solvent having 95 to 98% acetic acid and 5 to 2% water by weight and the conditions of temperature and pressure before mentioned for liquid phase operation. This high conversion oxidation, then is the starting process step in the combination of process steps that make the total process for obtaining high purity intramolecular anhydride of trimellitic acid in high yields based on the total trimellitic acid produced.

For the understanding and practice of the present invention it is necessary to know the amounts of aromatic co-products and by-products also present in the oxidation reaction effluent. These aromatic co-products and by-products have already been specifically identified by types. Most useful for the understanding and practice of this invention is not the precise amount of each specific aromatic co-product and by-product, but rather, the weight ratio of the total of said aromatic by-products and co-products related to the trimellitic acid present in the oxidation reaction effluent. The total weight of said aromatic co-products and by-products can be in the ratio range of from 5 to 25 parts per 100 parts of trimellitic acid by weight.

DESIRABLE OPERATING CONDITIONS

Desirable operating conditions for the process steps of this invention are given in the following description. Oxidation reaction effluent is obtain by the oxidation of pseudocumene with air in an oxidation zone at 400 to 410° F. and 310 to 325 p.s.i.g. in the presence of 3 to 3.5 parts inclusive of 95 to 98% aqueous acetic acid (5 to 2% water) per part of pseudocumene of 91 to 98% by weight purity in the presence of heavy metals (e.g. supplied cobalt and manganese tetrahydrates) in a total concentration of 0.06 to 0.30 weight percent as metals and bromide as provided by sodium bromide and/or tetrabromoethane in a bromide concentration of 0.15 to 0.70 weight percent. The weight percent of catalyst components are based on the acetic acid solvent. The resulting oxidation effluent withdrawn from the oxidation zone is at 400 to 410° F. and 310 to 325 p.s.i.g. and contains trimellitic acid in an amount equivalent to 1.35 to 1.61 pounds per pound of pseudocumene and aromatic impurities in the range of 30 to 9 pounds per 100 pounds of trimellitic acid.

The oxidation reaction effluent and residue flasher condensate after obtained are continuously charged below the stirred liquid level in the first crystallization zone operated at 320 to 285° F. and 60 to 39 p.s.i.a. to crystallize 5 to 30% of the total trimellitic acid present. Sensible heat is removed by evaporation of acetic acid and water. The hold time is 0.5 to 2.0 hours.

The slurry of crystals produced in the first stirred crystallization zone is continuously charged to a second stirred crystallization zone operated at 120 to 140° F. and 75 to 115 mm. Hg absolute. A slurry of trimellitic acid crystals of from 23 to 35% crystal solids by weight is obtained depending upon the portion removed from or returned to each crystallization zone of the vaporized water and acetic acid.

The slurry from the second crystallization zone is continuously pumped to a centrifugal filter or filter press and trimellitic acid crystal cake is separated at 120 to 140° F. The crystal cake is washed with 0.7 to 0.75 pound of 95 to 98% acetic acid per pound of cake (dry basis). The mother liquor and wash liquor are collected in one surge drum. The filter cake contains 15 to 30% acetic acid.

The acetic acid wet filter cake is continuously charged by screw conveyor to a boiler containing molten crude trimellitic anhydride at 450° F. and 325 mm. Hg. The boiler preferably consists of an upper and lower section and a screw or agitator is used to induce flow between the two sections. The hold time in the boiler is 0.5 to 1.0 hour which is sufficient time to assure removal of acetic acid and dehydrate trimellitic acid to its intromolecular anhydride. Some of the anhydride tends to leave the top of the boiler with the acetic acid vapors. These vapors are passed through a short vertical reflux tower mounted at the vapor exit of the boiler. The top temperature of the tower is 395° F. and the bottom temperature is about 220° F. This is sufficient to condense only the anhydride vapors and return anhydride condensate to the boiler.

Liquid is withdrawn continuously from the dehydration boiler in an amount equivalent in weight to the dry solids content of the wet cake fed to the boiler. This liquid containing crude trimellitic anhydride (3 to 5% impurities) is continuously charged to an anhydride product flasher operated at 425° to 575° F. and 10 to 55 mm. Hg absolute. The product flasher can consist of a reboiler and a short column, or the product flasher can consist of a falling film type vaporizer operated at 10 mm. Hg absolute at which pressure trimellitic anhydride boils at 462° F. The vapor mixture from either product flasher passes through a hot condenser to condense only the anhydride. The liquid anhydride is cooled to about 350° F. at 10 mm. Hg absolute. The materials boiling below trimellitic anhydride are drawn off as vapors.

The liquid trimellitic anhydride condensate at 350° F. and 10 mm. Hg absolute is pumped to a flaker cooled by 135° F. water. This flashed product has an anhydride purity of 97 to 99% and is recovered in a yield in the range of 90 to 97% based on the total trimellitic acid in the oxidation reaction effluent.

The combined acetic acid mother liquor and wash liquor collected in the surge drum following filtration to recover trimellitic acid crystals is continuously charged to a stripping zone operated at 0 to 10 p.s.i.g. and 450 to 500° F. where substantially all of the water and acetic are vaporized and sent as vapor or condensate feed to a fractionation zone to concentrate the acetic acid to 95 to 98% by weight. The residue in the stripping zone is liquid. This liquid at 450° to 500° F. is charged as feed to a stripper residue flasher operated at 5 to 15 mm. Hg absolute and 450° to 600° F. About 80 to 85% of the trimellitic anhydride content of the liquid stripper bottoms with some lower boiling impurities are vaporized and condensed. The condensate contains 85 to 90% trimellitic anhydride. This residue flasher condensate is charged as liquid to the first crystallization zone with oxidation reaction effluent as before mentioned.

The type of oxidation reaction effluent, two stage crystallization, stripping of combined acetic acid mother liquor and wash liquor flashing of stripper residue to obtain stripper residue flash condensate, use of residue flasher condensate with oxidation reaction effluent in the first crystallizer, the dehydration-drying of acetic acid wet trimelltic acid, and flash purification of crude liquid trimellitic anhydride from the dehydration-drying liquid residue all cooperate with the preceding and following steps to provide ultimately the recovery of 90 to 97% of the total trimellitic acid first produced as product of 97 to 99% anhydride content. The combination of those steps are essential for that result.

The following illustrative examples will demonstrate operation of the total process of this invention under preferred conditions.

EXAMPLE 1

A $C_9$ aromatic hydrocarbon feed stock containing 91 weight percent pseudocumene is oxidized with air in an oxidation zone under liquid phase conditions at 400° F. and 325 p.s.i.g. in the presence of 3.0 weight parts of acetic acid (3% water content) solvent per weight part of $C_9$ feed stock and 0.23 weight percent total of cobalt and manganese (calculated as metals but added as their acetate tetrahydrates) and a bromine source to provide 0.3 weight percent bromide ion. Both catalyst component concentrations are based on acetic acid solvent. The oxidation is conducted for a $C_9$ aromatic feed stock hold time of 80 minutes. This oxidation produces 135 pounds trimellitic acid per 100 pounds of pseudocumene in the $C_9$ aromatic feed stock.

The oxidation reaction effluent has as solvent an aqueous acetic acid of 14.5% water and 85.5% acetic acid by weight. On the basis of 100 weight parts of that aqueous acetic acid there are present in the oxidation reaction effluent 36.3 parts trimellitic acid, 1.18 parts total oxidation aromatic co-products and by-products and about 0.12 part of catalyst components. This oxidation reaction effluent is treated in the following continuous manner where all "parts" are by weight.

The oxidation reaction effluent at 400° F. and 325 p.s.i.g. is continuously combined with 18.8 parts per hour of residue flasher liquid to provide a total of 536 parts per hour for discharge into the stirred liquid in a first crystallization vessel operated at 285° F. and 39 p.s.i.a. Sensible heat is removed from the oxidation effluent by surface evaporation of acetic acid and water. Wet acetic acid vapors are condensed and returned to the stirred liquid in the first crystallization vessel. At about 60 minute hold time, 20% of the trimellitic acid present in the oxidation effluent is crystallized. The resulting slurry flows into the stirred liquid in a second crystallization vessel operated at 140° F. and 115 mm. Hg absolute pressure. Under these conditions 119 parts per hour trimellitic acid of the 137 total parts in the combined feeds entering the second crystallization vessel are precipitated as crystals. Again the vapors of acetic acid and water evaporated from the liquid surface are condensed and returned to the liquid in the second crystallization vessel.

Slurry is pumped from the second crystallization vessel to a centrifuge where 119 parts (dry basis) trimellitic acid per hour are recovered as wet filter cake. This filter cake is washed with 87 pounds per hour 98% acetic acid to displace the acetic acid mother liquor on the wet cake. The combined acetic acid mother liquor and wash liquor provide a flow of 462 parts per hour to a collection surge drum for further processing to recover trimellitic acid values.

The wet cake of crystalline trimellitic acid discharged from the centrifuge at 146 parts per hour and contains on an hourly basis 119 parts trimellitic acid, 22 parts acetic acid and 5 parts impurities, mainly aromatic impurities. The wet cake is fed by screw conveyor into a boiler containing molten trimellitic intramolecular anhydride at 475° F. at about atmospheric pressure. The acetic acid in the cake evaporates and the vapors are conducted through a reflux condenser operated at atmospheric pressure to condense only vaporized trimellitic anhydride and return liquid anhydride to the boiler liquids. The uncondensed acetic acid vapors also contains some water and these wet acetic acid vapors are transferred as part of the feed for acetic acid concentration. Steam entering the bottom portion of the reflux condenser at 220° F. will provide the necessary condensation of trimellitic anhydride.

Liquid at 475° F. containing 114 parts per hour trimellitic anhydride flows from the boiler to a product flasher operated at 475° F. and 10 mm. Hg absolute pressure. About 104 pounds trimellitic anhydride vapors per hour are taken overhead and condensed as liquid. This is about 91.5% of the anhydride charged to the product flasher and is equivalent to 93.5% of the total trimellitic acid formed during oxidation. A substantial portion of the iso- and terephthalic acid carried over with the flasher vapors crystallizes out in the flasher liquid phase. The flashed trimellitic anhydride product has an anhydride content of about 97%.

The 462 parts per hour flow of combined acetic acid mother and wash liquors obtained during centrifuging are charged to a stripping column, operated at atmospheric pressure. A large portion of acetic acid and water vaporize as this feed enters the column by heat supplied by a stripper bottoms reboiler operated at 500° F. Trimellitic acid, oxidation co-products and by-products, trimellitic anhydride, and unvaporized acetic acid flow downward through the column into the stripper reboiler. Acetic acid vaporizes and trimellitic acid dehydrates in bottoms reboiler. The reboiler vapors pass upwardly through the stripping column. The vapors from the top of the column are condensed, a portion are returned to provide reflux and 405 parts per hour condensate are removed and transferred as part of the feed for acetic acid concentration. Stripper bottoms reboiler liquid at 57 parts per hour flow into a flashing vessel operated at 6 to 9 mm. Hg absolute pressure. Heat is supplied to the flasher to provide a temperature of up to 600° F. About 34% of the feed is flashed overhead and is condensed. The liquid condensate is about 18.8 parts per hour and contains about 85% trimellitic anhydride. These 18.8 parts per hour liquid condensate are transferred to the first crystallization vessel.

EXAMPLE 2

A $C_9$ aromatic hydrocarbon feed stock having 98% by weight pseudocumene is oxidized with air in the presence of acetic acid (3% water) solvent in the weight ratio of 3.5 parts acetic acid per part of $C_9$ hydrocarbon feed. The catalyst component concentrations based on acetic acid solvent are 0.47% total metals (cobalt and manganese) and 0.30% bromine by weight. The oxidation reaction effluent at 410° F. and 350 p.s.i.g. is discharged into a first crystallization vessel.

The first crystallization vessel is operated at 340° F. and 75 p.s.i.g. The oxidation reaction effluent contains trimellitic acid in an amount equal to 1.6 parts of trimellitic acid per part of $C_9$ aromatic hydrocarbon feed stock. The oxidation reaction effluent discharges into the stirred liquid in the first crystallization vessel with stripper bottoms flasher over head condensate. The acetic acid and water vapors evaporating by removal of sensible heat going from 410° F. and 350 p.s.i.g. down to 340° F. and 75 p.s.i.g. in the first crystallization vessel are removed and provide part of the feed for acetic acid dehydration. A portion of the total trimellitic acid in the oxidation effluent is crystallized, 5 to 30% depending upon the hold time in this first crystallization. At a hold time of 0.5 hour about 5 to 6% crystallizes and at a two hour hold time 25 to 30% can crystallize. The precise proportion crystallized is not important because the second crystallization zone can be operated at various combinations of temperature, pressure, hold time, and solvent removal to maximize yield of crystalline product.

It is preferred to operate the second crystallizer at 120° F. and 70 mm. Hg absolute pressure. The vapors generated from the surface of stirred liquid in this crystallizer are condensed at 115° F. and a portion of the condensate is added to the slurry flowing from the first crystallizer at 340° F. and 70 p.s.i.g. to cool that slurry to about 290° F. and reduce the vapor pressure to about 45 p.s.i.g. The dilute cooled slurry is added to recycle slurry from the second crystallizer at a recycle to feed slurry rate of 12 to 1 by weight. The mixed stream becomes about 10% saturated at 135° F. (2 p.s.i.a. vapor pressure). A back pressure of 35 p.s.i.g. on the fluid flowing in the recycle loop prevents flashing in the loop. The recycle loop discharges into the stirred liquid in the second crystallizer and flashing at the inlet is prevented. Final cooling occurs by acetic acid and water evaporation from the surface of the stirred liquid. The portion of the 115° F. condensate not used to dilute the slurry from the first crystallizer is sent to acetic acid concentration as a part of its feed. In this way a 35% solids content slurry can be withdrawn from the second crystallizer, 8 to 9 parts trimellitic acid per 100 parts acetic acid solvent by weight remain in solution with about 5 parts of aromatic oxidation co-products and by-products. The slurry withdrawn from the second crystallizer is filtered on in a rotary vacuum filter. The filter cake is washed with 0.7 part acetic acid per part of cake (dry basis). Mother liquor and wash liquor are combined and collected for further processing later described.

Wet cake at 15,000 parts per hour are charged by screw conveyor into a boiler containing molten impure trimellitic anhydride at 450° F. and 325 mm. Hg absolute pressure. Under these conditions dehydration and solvent flashing are accomplished in 0.5 hour hold time as against 4 hours at atmospheric pressure. A portion of the molten impure trimellitic anhydride is withdrawn. This withdrawn liquid contains about 3% impurities by weight. The hot vapors exit from the boiler through a knockback condenser where most of the vaporized trimellitic anhydride condenses as liquid at the outlet temperature of 395° F. The uncondensed vapors are conducted either as vapors or are condensed and the condensate conducted to acetic acid concentration as part of its feed.

The liquid withdrawn from the boiler is pumped through a product vaporizer of the wiped film type operating at 10 mm. Hg absolute pressure. At this pressure trimellitic anhydride boils at 462° F. The vaporizer discharges into a liquid-vapor separator and about 8% of the total feed to the vaporizer is pumped to residue processing. The vapors are condensed and the condensate sub-cooled to 350° F. and 10 mm. Hg. The uncondensed vapors are separately condensed and pumped to residue processing. The sub-cooled condensate is pumped through a porous metal filter at about 15 gallons per minute to remove solid iso- and terephthalic acids. The filtrate is flaked on a drum flasher cooled with 135° F. water. This flaked product has an anhydride purity of 98.5% and represents a recovery of 97% of the total trimellitic acid in the oxidation reaction effluent.

The combined acetic acid mother and was liquors from the rotary vacuum filter are charged at 120° F. at 46 gallons per minute through a preheater into a stripper stillpot operated at 450° F. and 9 p.s.i.g. the vapors from the stripper stillpot are charged to a stripping column. The vapors leaving the top of the stripping column, acetic acid and water vapors, are at 245° F. and 7.5 p.s.i.g. The liquid leaving the bottom of the stripping column flow back to the stripper stillpot. Stripper boiler liquid residue is transferred to residue processing.

Residue processing feed comprises crude trimellitic acid from these three mentioned sources: the 8% vaporizer feed liquids, condensate from vapors passing through product condenser and stripper boiler liquid residue. These combined liquids are heated to 450° F. at 13 mm. Hg absolute pressure in a residue processing boiler. The vapors generated, after passing through a knockback condenser to minimize anhydride vapor loss, are condensed to liquid, the heat of condensation exchanged for steam production, and the liquid is burned. The liquid remaining in the residue processing boiler is pumped at 40 gallons per minute and 15 p.s.i.g. pressure to a residue evaporator operated at 650° F. and 10 mm. Hg absolute pressure. The liquid residue is incinerated. The vapor at 650° F. and 10 mm. Hg is about 90% trimellitic anhydride and is condensed and pumped at 8 gallons per minute to the first crystallizer and there combined with the oxidation reaction effluent being cooled to 340° F. and 75 p.s.i.g.

The two completely described processes for high recovery of trimellitic acid produced by the air oxidation as trimellitic intramolecular anhydride having 97 to 98.5% anhydride content demonstrate the cooperation between process steps and the dependency of each process step on the preceding and subsequent process steps to produce not only a better product but also a higher yield than before obtainable.

The foregoing processes can be carried out in various combinations of inter-connected apparatus. However, there has been devised a particular integrated system of inter-connected processing apparatus advantageous for the commercial practice of the process of this invention for the production of the intramolecular anhydride of trimellitic acid from pseudocumene. Such a system is shown in the accompanying drawings.

There has been devised an integrated system for the commercial production of trimellitic acid. The simplest integrated commercial system is one wherein all operations, except pseudocumene oxidation, are conducted continuously. In such an integrated system there is an oxidation vessel having an oxidation zone wherein the oxidation reaction is carried out, and a surge vessel to receive the oxidation vessel effluent from one or more oxidations and in which crystallization of trimellitic acid from solution in the acetic acid reaction solvent can be first conducted and provide a continuous supply of feed for the remainder of the system. There is also a second crystallization vessel means for separating crystalline trimellitic acid product from the mother liquor, means for recovering for recycle to the oxidation vessel the acetic acid in the mother liquor, means for reducing the pressure from that at which the reaction effluent is produced to atmospheric pressure, means for cooling to accomplish crystallization, provisions for washing the recovered crystalline trimellitic acid to remove adhering mother liquor and provisions for recycle of at least acetic acid recovered from the mother liquor.

FIGURE 1 of the accompanying drawings is a diagrammatic representation of a portion of an integrated commercial system for producing trimellitic acid and includes provisions for oxidation, introducing the materials essential for oxidation such as the trialkylbenzene charge stock, solvent, catalyst and air into the oxidation vessel, for receiving and crystallizing trimellitic acid from the effluent from the oxidation vessel and for recovering the crystallized trimellitic acid from the mother liquor.

FIGURE 2 of the accompanying drawings illustrates diagrammatically a system for processing the mother and wash liquors with provisions for stripping wet acetic acid from the mother liquor, concentrating wet acetic acid, recycling concentrated acetic acid and for processing aromatic compounds dissolved in the mother liquor.

FIG. 3 of the accompanying drawings illustrates diagrammatically a system for converting trimellitic acid to its intramolecular anhydride including a dehydration vessel, a means for separating a purified anhydride product from the crude anhydride product and a means for preparing the anhydride in a form ready for shipment and/or use as a starting material for use in chemical reactions.

More specifically with reference to FIGURE 1, the integrated system comprises one or more oxidizing vessel, such as oxidizing vessel 11 shown with means for agitating the liquid in the oxidation zone such as stirrer 17 if desired or needed by the particular design of oxidizing vessel 11 and the manner in which gas containing free oxygen such as air is introduced into the oxidation zone. Oxidation vessel 11 is provided with means for heating the reaction mixture to maintain the oxidation temperature during the portion of the reaction when the oxygen content of the gasiform mixture leaving the oxidation zone contains more than 8 to 10% oxygen by volumne, the latter 1/3 to 1/2 of the reaction. Suitable means for supplying heat to maintain reaction temperature includes the heating jacket 11a as shown, internal heating coils which may also function as to provide improved contact between gaseous oxygen and the liquid reaction medium, electrical heating elements positioned externally around about oxidizing vessel 11 to heat only the oxidation zone, or any other means for supplying heat to the oxidation zone. For large scale catalytic liquid phase air oxidations of $C_9$ aromatics high in pseudocumene as are conducted in a commercial plant, the heat of reaction during the latter portion of the oxidation is not sufficient to maintain an efficient oxidation temperature and without the addition of heat by some indirect heat exchange, in the manner before disclosed. Without addition of external heat the reaction would proceed too slowly for efficient industrial utilization. The application of external heating can be actuated by means (not shown) responsive to an oxygen analyzer (not shown) which samples and analyzes the gasiform mixture coming from the oxidation zone, for example the sampling of such a gasiform mixture may be accomplished by withdrawing a sample of either the gasiform stream flowing in conduit 18 or in conduit 26. In this manner the addition of external heat may be made automatic. The addition of heat from external sources can, of course, be made manually at the desired period of time in the reaction cycle when the net oxygen taken up by the reaction (total oxygen less oxygen in $CO_2$ and CO is of the gasiform mixture) reaches 3 to 3.5 mole per mole of $C_9$ aromatic hydrocarbon feed. To oxidize the three methyl groups to COOH groups the theoretical oxygen is 4.5 moles per mole of pseudocumene.

The operation of the system is started by charging to oxidizing vessel 11, the $C_9$ aromatic hydrocarbon through feedstock conduit 10, make up acetic acid (95% to 98%) solvent through conduit 14 and catalyst generally as a solution of a source of bromine such as an organic or inorganic bromide and a source of heavy metal oxidation catalyst such as a solution of a salt of the heavy metal in a small amount of water or acetic acid solvent or dissolved in the $C_9$ aromatic feed stock. As shown in FIGURE 1 the ingredients that go to make up the liquid phase reaction mixture in the oxidation zone all flow into acetic acid recycle conduit 12 and thence into oxidizing vessel 11. The liquid mixture can be passed through a preheater (not shown) before entering oxidizing vessel 11 and be heated to a temperature at which oxidation will at least be initiated or the liquid mixture can be heated to reaction temperature in oxidizing vessel by the means provided for adding external heat during the latter portion of the oxidation reaction.

Pressurized air is charged through conduit 16 into the liquid phase reaction mixture through the bottom of oxidizing vessel 11. Oxidation reaction effluent is withdrawn through valved conduit 28, is discharged into reactor surge 32 through pressure reducer 29 and conduit 30 below the liquid level in reactor surge 32.

Heat is given off for about the first ½ to ⅔ of the oxidation causing boil-up of solvent and/or hydrocarbon. Their vapors together with by-product water vapor leave the oxidation zone in admixture with nitrogen, unreacted oxygen and oxides of carbon. This gasiform mixture leaves oxidizing vessel 11 through conduit 18, passes through cooler 19 and conduit 20 to liquid-gas separator 21. Condensate in separator 21 is returned to oxidizing vessel 11 through conduit 22. During periods of the reaction when the heat removal load is high it is advantageous to have a knockback cooler as the vertical portion of conduit 18, as for example by having a cooling jacket on the vertical portion of conduit 18. This is also advantageous during the latter portion of the reaction when boil up of solvent is rather low because then cooler 19 need not be in operation. In this case hydrocarbon is no longer present to back up and vapors of water and solvent are condensed and the condensate returns directly to the oxidation zone. The uncondensed gases and vapors are scrubbed with water in high pressure (H.P.) absorber 24 to remove acetic acid vapors and the scrubbed gases are vented by conduit 26 through a pressure control valve (not shown) to the atmosphere. The aqueous acetic acid from H.P. absorber 24 is sent to acetic acid concentration by conduits 27 and 50.

Upon completion of the oxidation reaction, liquid effluent from the oxidation zone is discharged through valved conduit 28, pressure reducer 29 and conduit 30 together with flasher overhead fraction from conduit 128 to reactor surge 32. Reactor surge 32 is the first crystallization vessel and can handle oxidation reaction effluent from one or more oxidizing vessels. By using reactor surge 32 as the first crystallization vessel for 2 or more of oxidation vessel 11, the remainder of the process can be carried out continuously even though the oxidations are not conducted continuously. Advantage can be taken of the pressure of and the temperature of the liquid effluent to cool the oxidation reaction effluent by removal of sensible heat as before mentioned. This can be advantageously done by flashing solvent and water in reactor surge tank 32. The resulting vapors exit through conduit 35 and are condensed by cooler 36. The condensate flows to liquid-vapor separator 38 and the liquid is returned to reactor surge 32 by valved conduit 39 or all or a portion of the liquid condensate is withdrawn by valved conduit 45–46 and sent via conduit 50 to acetic acid concentration. Agitator 33 in reactor surge 32 is employed to keep in suspension trimellitic acid crystallized therein.

The amount of solvent, wet acetic acid, flashed off in surge tank 32 will depend on the temperature and pressure of the liquid effluent removed from oxidizing vessel 11 and whether it is desired to provide additional heat added from an external source as by means of the internal heat exchange coil 34. The same internal coil 34 can be employed to extract heat, if desired, to aid in further cooling of the mixture beyond the flash removal of sensible heat.

The cooled and depressurized mixture in reactor surge 32 flows therefrom through conduit 60 to crystallizer 61 operated at reduced pressure, as before disclosed, imposed therein by any means; e.g., vacuum jet 72 through conduit 71 connected to the vapor space in liquid-gas separator 67 which receives condensate and vapors from crystallizer 61 through conduit 64, cooler 65 and conduit 66. All of the condensate from separator 67 can be returned through conduit 68 and valved conduit 69 or all the condensate can be withdrawn by pump 76, conduit 68 and valved conduit 70 and used to wash trimellitic acid cake. Internal cooling e.g. by coil 63 shown in crystallizer 61, can be used, if desired, for additional cooling or to supply heat to evaporate a greater amount of solvent. Crystallizer 61 has a stirrer or agitator 62 to keep in suspension the crystallized trimellitic acid.

Separation of the solid phase (crystallized trimellitic acid) from the liquid phase (acetic acid mother liquor) can be accomplished by the use of any device for accomplishing such a phase separation. For example, the phase separation can be carried out by decantation, filtration or centrifugation. Centrifugal filters, filter presses or vacuum rotary filters can be employed for recovering the crystallized trimellitic acid from the mother liquor. The slurry of trimellitic acid crystals is withdrawn from crystallizer 61 through conduit 78 by pump 78a and discharged by conduit 79. A portion can be recycled to crystallizer 64 by conduit 79a; to solid-liquid separator 80 to obtain a trimellitic acid crystal cake. This cake is washed with recycle concentrated acetic acid flowing in conduit 165 by wash conduit 166 discharging into solid-liquid separator 80. Mother liquor and wash liquor are collected through conduit 81 in mother and wash liquor surge 82. Wet cake can be discharged through transfer lines 170 and 170b to dryer 172 or discharged through transfer line 170a to acid product dehydrator 200 shown in FIGURE 3. Transfer lines 170, 170a and 170b are preferably screw conveyors although they can be belt or scoop conveyors. Dryer 172 can be a rotating dryer feed with hot gas from line 173. Dryer gas exits through line 174 to centrifugal separator 175 and line 177b. The fines separated in centrifugal separator 175 are combined by transfer line 176 with dry product flowing in line 178. The dried product can be stored as feed for the anhydride production or feed directly to the dehydration system shown in FIGURE 3. It is preferred not to dry the wet trimellitic acid crystals, but rather the wet cake is transferred by line 170a to dehydrator 200 (FIGURE 3).

FIGURE 2 illustrates the portion of the integrated system for processing acetic acid. Here the combined wash and mother liquors from recovery of solid trimellitic acid collected in mother and wash liquor surge 82 (shown in FIGURE 1) is charged through conduit 86 by pump 85 through preheater 87 and conduit 88 into mother liquor stripper 90. The combined mother and wash liquors contain trimellitic acid and aromatic co-products and by-products as before described. A mixture of water and acetic acid vapors is removed from the top of mother liquor stripper 90 by vapor transfer conduit 93 through cooler 94 and the condensate and uncondensed vapors are collected in vapor-liquid separator 96. The vapors are withdrawn through conduit 101 and condensed by stream jet 102. A portion of the condensate is returned by line 97, pump 98 and conduit 99 as reflux for the mother liquor stripper, if required, and the remainder of the condensate is sent via conduit 180 to acetic acid dehydrating tower 140 through its feed tank 51. The stripper bottoms flow through transfer line 106 to boiler 107 heated, for example by coil 108. The heated liquid is withdrawn from boiler 107 through transfer line 109 (heat traced) by pump 110 discharging through heat traced line 113 into stirred flash drum 112 operated at reduced pressure provided by steam jet 120 via overhead fraction receiver 117, vapor line 119, condensate line 116, cooler 115 and vapor transfer line 114 connected to flash drum 112. Overhead fraction condensate in its receiver 117 is withdrawn by lines 124 and 126 by pump 127 discharging into conduit 128 leading to reactor surge 32 to FIGURE 1. The stirred residue in flash drum 112 is purged. A small amount of overhead fraction liquid can be added via line 124 to keep this purge line open if necessary.

The wet acetic acid vapors removed from mother liquor stripper 90 (FIGURE 2) by conduit 100 and the wet acetic acid streams from conduits 50 and 105 are combined in wet acetic acid storage tank 51, heated by internal coil 52. The resulting aqueous acetic acid flows to acetic acid dehydrating tower 140 via conduit 53, pump 55, heat exchanger 56, and feed conduit 57. Water vapor with a small amount of acetic acid vapor and any pseudocumene present comes off as overhead through vapor line 46 through cooler 146 and condensate line 147 to separator 148 where hydrocarbon is drawn off via line 149 when need be. A part of the water condensate is returned as reflux as shown and the rest is discarded. Acetic acid of 95 to 98% by weight is withdrawn from the bottom of acetic acid dehydrating tower 140 through conduit 141, cooled by heat exchanger 160 and collected in acetic acid storage tank 162. Acetic acid for washing recovered trimellitic acid and for charging oxidizing vessel 11 is withdrawn by pump 164 discharging into conduit 165.

Now turning to FIGURE 3, the wet cake from solid-liquid separator 80 is fed through transfer line 170a to hopper 202 and thence by screw feed 203 into acid product dehydrator 200 that contains a molten crude anhydride. The wet cake charged to the molten liquid in acid product dehydrator 200 heated by means of internal coil 204 in which, for a source of heat, can be any fluid remaining liquid, the temperature employed to dehydrate trimellitic acid to its intramolecular anhydride. Advantageously, liquids are fed to internal coil 204 at about 600 to 700° F. Such materials as diphenyl oxide, chlorinated biphenyls, and chlorinated terphenyls which are fluids at 400 to 700° F. can be employed as heat transfer media. As the wet cake is introduced into dehydrator 200, the adhering acetic acid and water of dehydration flash off and are withdrawn as vapors through conduit 205 to hot condenser 206 operated at a temperature to condense only trimellitic anhydride, 334 to 360° F. Liquid trimellitic anhydride returns via conduit 207 to acid product dehydrator 200. Uncondensed vapors exit through conduit 208 and are transferred to acetic acid concentration, e.g. acetic acid dehydrating tower 140 in FIGURE 2. Hot condenser 206 can be used to generate steam as shown.

The thermal dehydration of trimellitic acid to its intramolecular anhydride can be shortened by passing an inert gas through the liquid in acid product dehydrator 200. Nitrogen, carbon dioxide, flue gas, air and even steam can be used as inert gas to sweep out the water split out during thermal dehydration. The temperatures of dehydration of trimellitic acid to its anhydride are sufficiently high so that steam does not react with the anhydride and reverse the dehydration.

After dehydration, the crude trimellitic anhydride product is processed to obtain a product having a high anhydride content, 97% or above by withdrawing a portion of the liquid from acid product dehydration 200 through valved conduit 209 to anhydride flasher 211 supplied by heat for example by heat transfer media in coil 212. Trimellitic acid is flashed rapidly and the anhydride vapors are transferred by conduit 213 through vapor cooler 217 and conduit 218 that discharges into liquid anhydride product receiver 219. Light ends are removed from liquid anhydride product receiver 219 through conduit 221 by steam jet 222.

Liquid anhydride product is withdrawn from liquid anhydride product receiver 219 by transfer line 225 by pump 226 and discharged through transfer line 227 into anhydride subcooler 228 where coil 229 keeps the anhydride just above its melting point. Solids in the anhydride product, generally crystals of iso- and terephthalic acid, are preferably removed by one or more microporous metal filters (not shown) in transfer line 227. These crystals can be permitted to settle out in flasher pan 231 from which they can be withdrawn periodically with some anhydride product through purge line 234. The filters can be in flasher feed line 230 or even in valved conduit 209. The liquid anhydride product is finally cooled and flaked by flaker 232. The flaked product is discharged down chute 233 to storage or packaging.

Pseudocumene-containing $C_9$ aromatic hydrocarbon feed stock can be oxidized in the presence of high ratios of acetic acid solvent to feed stock, i.e. weight ratios of 4 to 6 solvent to feed stock, to maintain intermediates oxidizable to trimellitic acid in solution and assure a more complete conversion of feedstock to desired product and thus have less of said intermediates as impurities in the trimellitic acid product. The crystallization operation can leave dissolved in the acetic acid mother liquor 30 to 40% of the trimellitic acid produced. In such a case it is advantageous to strip less of the acetic acid solvent from the mother liquor to obtain material for recycle to the first crystallization zone. The combined acetic acid mother and wash liquors are stripped of acetic acid and water until a concentrate equal to the removal of wash liquor and 65 to 75% of the acetic acid solvent from the mother liquor in place of 85 to 95% will provide an adequate concentrate. One advantage obtained is that the concentrate has a lower set point temperature than either the high melting mother liquor stripper bottoms or the overhead flasher fraction of those high melting bottoms. Another advantage is gained by having trimellitic acid in the free acid form in the concentrate as in the first crystallizer and not depend on hydrolysis of the anhydride to free acid in the two stage crystallization. Such a concentrating step can also eliminate the step of flashing the high melting stripper bottoms as well as heat tracing of these lines. Because a higher trimellitic acid concentration is present in each stage of the crystallization, less aqueous acetic acid need be taken overhead.

In the combination of apparatus to conduct the process of converting $C_9$ aromatic hydrocarbon containing 90 to 98% pseudocumene to high anhydride purity trimellitic intramolecular anhydride in equivalent of up to 95 to 97% of the trimellitic acid produced by oxidation of the apparatus elements that are essential are as follows. There must be one or more oxidation vessels adopted for catalytic liquid phase oxidation at pressures of 170 to 450 p.s.i.g. pressure having a pressure regulating means, means for charging reactants, solvent and catalyst means for removing heat of reaction, means for adding heat after 3 to 3.5 net moles of oxygen per mole of $C_9$ aromatic feed stock have been absorbed and means for withdrawing oxidation reaction effluent at the pressure and temperature of oxidation. There must be two or more series connected crystallization vessels wherein the first crystallization vessel can receive below the surface of its stirred liquid contents said withdrawn oxidation reaction effluent and a recycle stream rich in trimellitic acid or anhydride and have means for continuously removing sensible heat by the evaporation from the surface of its liquid contents vapors of acetic acid and water and, preferably for also returning said removed vapors as condensate. The first crystallizer is series connected to the second crystallizer operated at an absolute pressure substantially below atmospheric pressure so that the lower pressure in the second crystallizer can draw slurry from the first crystallizer continuously without substantially affecting the pressure in the first crystallizer and discharging said slurry below the stirred liquid level in the second crystallizer. The second crystallizer must have means for removing vapors of acetic acid and water at said reduced pressure and for discharge by pumping of slurry produced in the second crystallizer.

A pump and a solid-liquid separating means, the pump is connected to the second crystallizer and through its discharge outlet to the solids-liquid separating means. A boiler having means to receive trimellitic acid crystalline mass wet with acetic acid from the solid-liquid separator and to transfer the wet crystalline mass to a pool of liquid trimellitic anhydride in the boiler, means for supplying heat to said liquid pool, a vapor outlet from said boiler permitting only vapors of acetic acid and water to exit therefrom and substantially no vapors of trimellitic anhydride and a liquid discharge outlet. An anhydride flash drum having a liquid receiving inlet, a vapor outlet and a liquid discharge outlet; an anhydride vapor condenser having a vapor receiving inlet and liquid discharge outlet; conduit connected to the liquid discharge outlet of the boiler and the liquid receiving inlet of the anhydride flash drum, vapor transfer from the vapor outlet of the flash drum to the vapor inlet of the anhydride vapor condenser and a conduit for flow of liquid anhydride condensate from the liquid discharge of the anhydride vapor condenser.

A solvent treating system comprising a distillation column with bottoms boiler to supply hot vapors to the bottoms of the column for upward vapor flow, a vapor discharge from the top of the column, and a bottoms boiler liquid discharge, liquid transfer from the solid-liquid separator to the column and liquid recycle transfer from the boiler liquid discharge to the first crystallizer.

Other apparatus preferably used in combination are a liquid anhydride filter either in the conduit transfer of liquid anhydride from the boiler having a pool of liquid anhydride to the anhydride flash drum or in the conduit transfer of liquid anhydride condensate and apparatus for flash evaporation of a portion of the column bottoms boiler liquid and condensing the flash evaporated vapors for transfer to the first crystallizer.

What is claimed is:

1. In a process for the manufacture of the intromolecular anhydride of trimellitic acid by the steps of catalytic liquid phase air oxidation of a $C_9$ aromatic hydrocarbon feedstock having at least 91 percent by weight of pseudocumene in an oxidation zone in the presence of acetic acid solvent having 95 to 98% acetic acid and 5 to 2% water by weight at a temperature within the range of 120 to 525° F. and a pressure to maintain a liquid phase, cooling the oxidation reaction effluent to crystallize trimellitic acid, separating and recovering crystallized trimellitic acid from the acetic acid solvent mother liquor washing the trimellitic acid crystals with acetic acid solvent, distilling from the acetic acid mother and wash liquors to obtain a mixture of acetic acid and water for concentration of the acetic acid content to provide acetic acid solvent concentrate for recycle to the oxidation and to obtain a bottoms fraction having high melting solids, heating the washed crystalline trimellitic acid to convert it to its intramolecular anhydride and distilling the anhydride to obtain trimellitic intramolecular anhydride product; the process improvements of conducting said oxidation in the presence of 2 to 6 parts acetic acid solvent per part of said $C_9$ aromatic hydrocarbon feedstock by weight at a temperature within the range of 325° to 450° F. and a pressure within the range of 170 to 410 p.s.i.g., cooling a mixture of the resulting oxidation reaction effluent and said bottoms fraction having high melting solids in two series staged stirred crystallization zones with stirring and heat removal by evaporation of acetic acid solvent from the liquid surface in each of said crystallization zones wherein the first crystallization zone is operated at 320 to 285° F. and 63 to 39 pounds per square inch absolute and the second crystallization zone is operated at 120 to 140° F. and an absolute pressure of 75 to 115 mm. Hg, separating and recovering trimellitic acid crystals and acetic acid mother liquor from the slurry of crystals in acetic acid solvent withdrawn from the second crystallization zone, washing the recovered crystalline trimellitic acid with acetic acid solvent having 95 to 98% acetic acid by weight, combining said acetic acid mother liquor and wash liquor as feed for distilling acetic acid and water mixture therefrom in an amount equal to the sum of acetic acid wash and 65 to 95% of acetic acid and water in said mother liquor leaving a residue having high melting solids for addition to the series staged crystallization, feeding the washed trimellitic acid to a pool of liquid crude trimellitic anhydride at 400 to 500° F. and a pressure of from 200 mm. Hg to 1.0 atmosphere thereby converting trimellitic acid feed to its intramolecular anhydride and evaporating acetic acid solvent, withdrawing an amount of the liquid crude trimellitic anhydride pool equivalent in weight to the trimellitic acid feed, distilling the withdrawn liquid crude trimellitic anhydride at a temperature of 575° to 425° F. and an absolute pressure of 10 to 55 mm. Hg and condensing the vaporized overhead fraction to obtain trimellitic intramolecular anhydride product.

2. The process of claim 1 wherein there is removed from the combined acetic acid mother and wash liquors acetic acid and water in an amount equal to the sum of acetic acid wash and 65 to 75% of acetic acid in the mother liquor to obtain a liquid concentrate having high melting solids for addition to the two stage series crystillization.

3. The process of claim 1 wherein there is removed from the combined acetic acid mother and wash liquors acetic acid and water in an amount equal to the sum of acetic acid wash and 90 to 95% of the acetic acid in the mother liquor to leave a liquid residue of high melting solids, flash distilling that liquid residue at a temperature of 400 to 600° F. and an absolute pressure of 5 to 10 mm. Hg, condensing as the vaporized fraction 80 to 95% of the trimellitic anhydride content of said high melting solids and adding this condensate to the first crystallization zone wtih the oxidation reaction effluent.

4. The process of claim 3 wherein the first crystallization zone is operated at a temperature of 340° F. and a pressure of 75 p.s.i.g., the second crystallization zone is operated at a temperature of 120° F. and a pressure of 75 mm. Hg absolute, the pool of liquid crude trimellitic anhydride is at a temperature of 450° F. and a pressure of 325 mm. Hg absolute and the withdrawn portion of the pool is flashed distilled at a temperature of 462° F. and a pressure of 10 mm. Hg absolute.

5. The process of claim 4 wherein the withdrawn liquid crude trimellitic anhydride is filtered before flash distillation.

References Cited

UNITED STATES PATENTS 3,261,846   7/1966   Meyer _____ 260—346.4

ALEX MAZEL, Primary Examiner
BERNARD I. DENTZ, Assistant Examiner

U.S. Cl. X.R.

260—523